United States Patent
Gummadi et al.

(10) Patent No.: US 12,185,094 B2
(45) Date of Patent: Dec. 31, 2024

(54) DEVICE PERFORMANCE WHEN T312 CONFIGURED

(71) Applicant: QUALCOMM Incorporated, San Diego, CA (US)

(72) Inventors: Bapineedu Chowdary Gummadi, Hyderabad (IN); Venkat Rasagna Reddy Komatireddy, Hyderabad (IN); Sanjay Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/404,622

(22) Filed: Jan. 4, 2024

(65) Prior Publication Data

US 2024/0147319 A1    May 2, 2024

(51) Int. Cl.
| | |
|---|---|
| *H04W 76/38* | (2018.01) |
| *H04W 36/24* | (2009.01) |
| *H04W 68/02* | (2009.01) |

(52) U.S. Cl.
CPC .......... *H04W 76/38* (2018.02); *H04W 36/249* (2023.05); *H04W 68/02* (2013.01)

(58) Field of Classification Search
CPC ............... H04W 36/249; H04W 68/02; H04W 76/38; H04W 36/0085; H04W 8/183; H04W 36/305; H04W 60/005; H04W 76/19; H04W 24/04; H04W 24/08;
(Continued)

(56) References Cited

U.S. PATENT DOCUMENTS

| | | |
|---|---|---|
| 2012/0142336 A1 | 6/2012 | Van et al. |
| 2013/0150126 A1 | 6/2013 | Pattaswamy et al. |
| 2015/0271717 A1 | 9/2015 | Moon et al. |

(Continued)

FOREIGN PATENT DOCUMENTS

| | | |
|---|---|---|
| WO | WO-2016198098 A1 | 12/2016 |
| WO | WO-2020067976 A1 | 4/2020 |
| WO | WO-2020162704 A1 | 8/2020 |

OTHER PUBLICATIONS

International Search Report and Written Opinion—PCT/US2022/071206—ISA/EPO—Sep. 19, 2022 (2100960WO).

(Continued)

*Primary Examiner* — Dinh Nguyen
(74) *Attorney, Agent, or Firm* — NORTON ROSE FULBRIGHT US LLP

(57) ABSTRACT

This disclosure provides systems, methods, and devices for wireless communication that support enhanced management of recovery timers in a wireless communication system. In a first aspect, a method of wireless communication includes an apparatus determining whether a recovery timer is currently running, the apparatus being configured for multi-subscriber identity module (SIM) communications including a first subscription and a second subscription. The apparatus is further configured to tune away from the first subscription to the second subscription when the recovery timer is determined not to be currently running, and determine to forego tuning away from the first subscription to the second subscription when the recovery timer is determined to be currently running. Other aspects and features are also claimed and described.

20 Claims, 8 Drawing Sheets

(58) Field of Classification Search
CPC ........... H04W 36/00692; H04W 48/18; H04W 68/12; H04W 88/06; H04B 17/328; H04B 17/336
See application file for complete search history.

(56) References Cited

U.S. PATENT DOCUMENTS

| | | |
|---|---|---|
| 2017/0208611 A1 | 7/2017 | Chincholi et al. |
| 2018/0288732 A1 | 10/2018 | Balasubramaniam et al. |
| 2019/0124575 A1 | 4/2019 | Long et al. |
| 2020/0037242 A1* | 1/2020 | Yilmaz ............. H04W 52/0216 |
| 2022/0345960 A1 | 10/2022 | Gummadi |

OTHER PUBLICATIONS

Oppo: "Further Considerations for T312-based Mechanism", 3GPP TSG-RAN WG2 Meeting #108, R2-1915159, 3rd Generation Partnership Project, Mobile Competence Centre, 650, Route Des Lucioles, F-06921 Sophia-Antipolis Cedex, France, vol. RAN WG2, No. Reno, USA, Nov. 18, 2019-Nov. 22, 2019, 3 Pages, Nov. 8, 2019, XP051817057, paragraph [0002], p. 1, figure 1.
Partial International Search Report—PCT/US2022/071206—ISA/EPO—Jun. 30, 2022 (2100960WO).

* cited by examiner

DEVICE PERFORMANCE WHEN T312 CONFIGURED

CROSS-REFERENCE TO RELATED APPLICATIONS

This application is a divisional of, and claims the benefit of, U.S. patent application Ser. No. 17/239,429, entitled, "IMPROVING DEVICE PERFORMANCE WHEN T312 CONFIGURED," filed on Apr. 23, 2021, the disclosure of which is expressly incorporated by reference herein in its entirety.

TECHNICAL FIELD

Aspects of the present disclosure relate generally to wireless communication systems, and more particularly, to recovery timers. Some features may enable and provide improved communications, including enhanced management of recovery timers.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes determining, by the UE, whether a recovery timer is currently running. In aspects, the UE may be configured for multi-subscriber identity module (SIM) communications including a first subscription and a second subscription. The method further includes tuning away from the first subscription to the second subscription when the recovery timer is determined not to be currently running, and determining to forego tuning away from the first subscription to the second subscription when the recovery timer is determined to be currently running.

In an additional aspect of the disclosure, a method of wireless communication performed by a UE includes determining, by the UE, that a recovery timer is currently running for the UE. In aspects, the UE may be a first measurement identity configured with a first duration for the recovery timer. The method further includes detecting a measurement event associated with a second measurement identity, and determining to reset the recovery timer in response to detecting the measurement event associated with the second measurement identity.

In an additional aspect of the disclosure, an apparatus configured for wireless communication is disclosed. The apparatus includes at least one processor, and a memory coupled to the at least one processor. The at least one processor is configured to determine, by the UE, whether a recovery timer is currently running. In aspects, the UE may be configured for multi-SIM communications including a first subscription and a second subscription. The at least one processor is further configured to tune away from the first subscription to the second subscription when the recovery timer is determined not to be currently running, and determine to forego tuning away from the first subscription to the second subscription when the recovery timer is determined to be currently running.

In an additional aspect of the disclosure, an apparatus configured for wireless communication is disclosed. The apparatus includes at least one processor, and a memory coupled to the at least one processor. The at least one processor is configured to determine, by the UE, that a recovery timer is currently running for the UE. In aspects, the UE may be a first measurement identity configured with a first duration for the recovery timer. The at least one processor is further configured to detect a measurement event associated with a second measurement identity, and determine to reset the recovery timer in response to detecting the measurement event associated with the second measurement identity.

In an additional aspect of the disclosure, an apparatus configured for wireless communication is disclosed. The apparatus includes means for determining, by the UE, whether a recovery timer is currently running. In aspects, the UE may be configured for multi-SIM communications including a first subscription and a second subscription. The apparatus further includes means for tuning away from the first subscription to the second subscription when the recovery timer is determined not to be currently running, and means for determining to forego tuning away from the first subscription to the second subscription when the recovery timer is determined to be currently running.

In an additional aspect of the disclosure, an apparatus configured for wireless communication is disclosed. The apparatus includes means for determining, by the UE, that a recovery timer is currently running for the UE. In aspects, the UE may be a first measurement identity configured with a first duration for the recovery timer. The apparatus further includes means for detecting a measurement event associated with a second measurement identity, and means for determining to reset the recovery timer in response to detecting the measurement event associated with the second measurement identity.

In an additional aspect of the disclosure, a non-transitory computer-readable medium stores instructions that, when executed by a processor, cause the processor to perform operations including determining, by the UE, whether a recovery timer is currently running. In aspects, the UE may be configured for multi-SIM communications including a first subscription and a second subscription. The operations further include tuning away from the first subscription to the second subscription when the recovery timer is determined not to be currently running, and determining to forego tuning away from the first subscription to the second subscription when the recovery timer is determined to be currently running.

In an additional aspect of the disclosure, a non-transitory computer-readable medium stores instructions that, when executed by a processor, cause the processor to perform operations including determining, by the UE, that a recovery timer is currently running for the UE. In aspects, the UE may be a first measurement identity configured with a first duration for the recovery timer. The operations further include detecting a measurement event associated with a second measurement identity, and determining to reset the recovery timer in response to detecting the measurement event associated with the second measurement identity.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
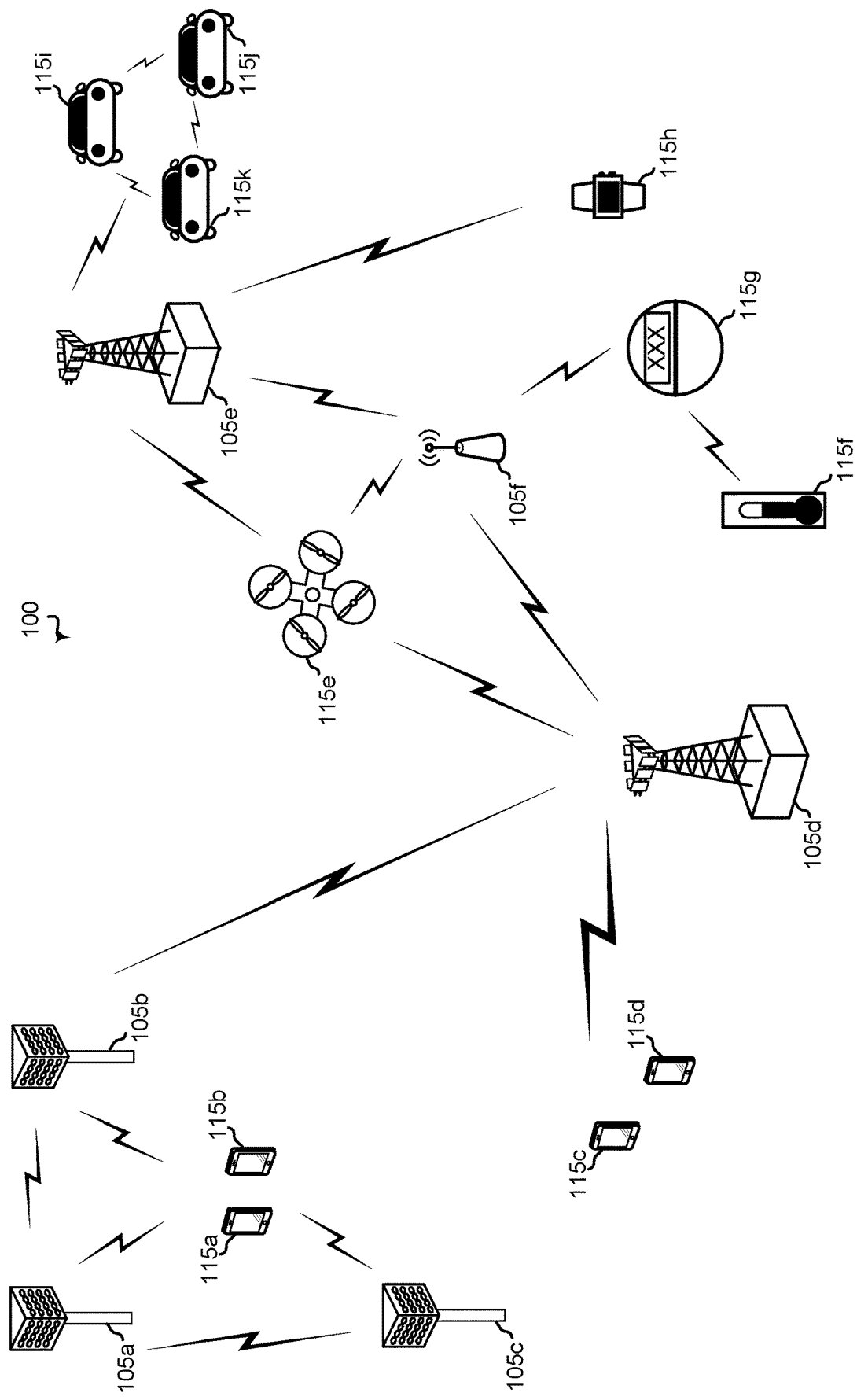
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support enhanced management of recovery timers in a wireless communication system. In particular, aspects of the present disclosure provide for managing recovery timers (e.g., a T312 timer) in multi-subscriber identity module (SIM) communications by defining controls for determining when to tune away from a first subscription to a second subscription, and when to forego tuning away, based on whether a recovery timer is currently running, in order to prevent a handover command miss (or a PSCell change command miss). In aspects, the present disclosure also provides for managing and control recovery timers (e.g., a T312 timer) to determine whether to reset the recovery timers based on transmission of measurement reports by multiple measurement identities, in order to increase the probability that a handover command (or a PSCell change command) is received by a measurement identity.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, aerial vehicles, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports communications with ultra-reliable and redundant links for devices, such as UE 115e. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
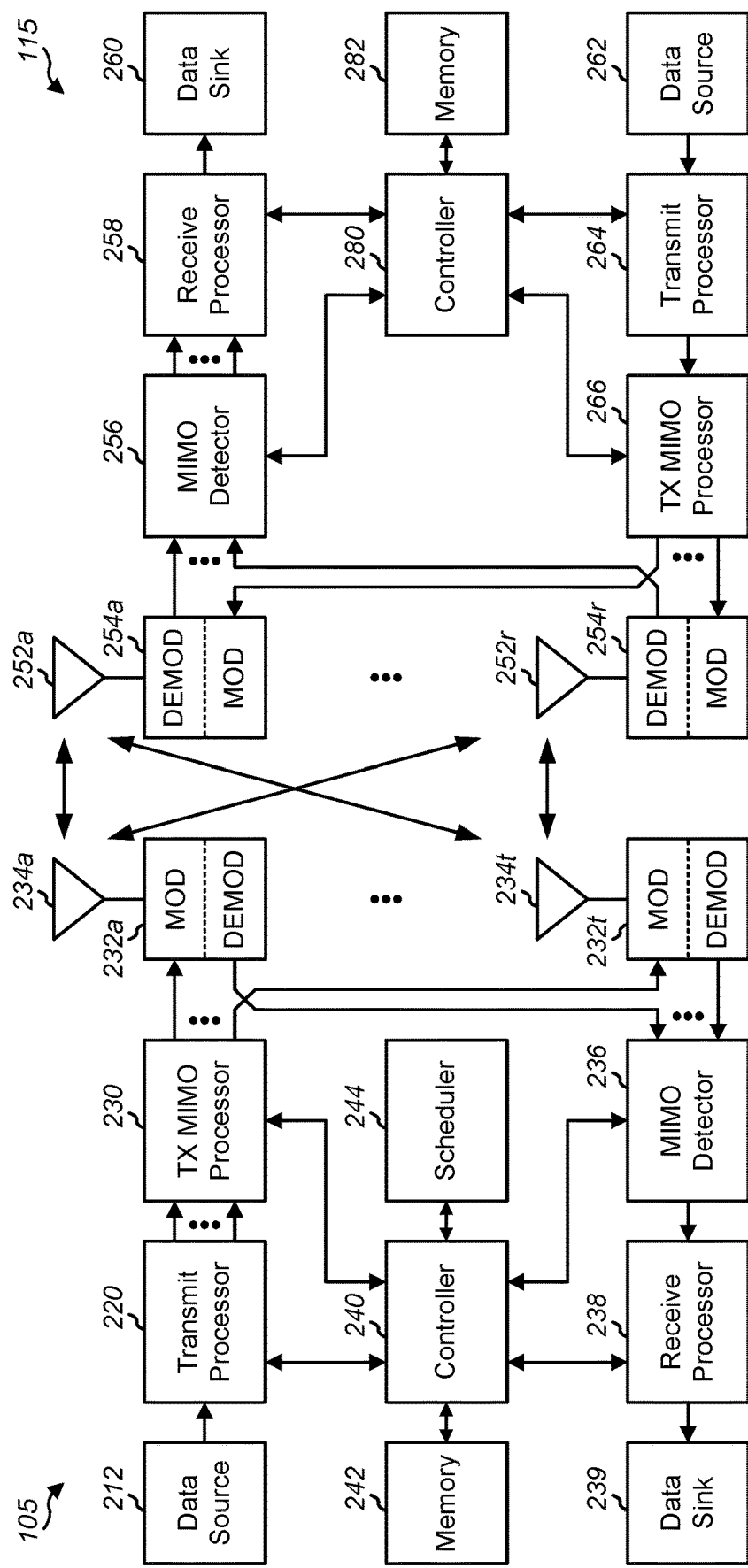
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) of modulator/demodulators 232a through 232t. For example, spatial processing performed on the data symbols, the control symbols, or the reference symbols may include precoding. Each modulator of modulator/demodulators 232 may process a respective output symbol stream (e.g., for OFDM, etc.) to obtain an output sample stream. Each modulator of modulator/demodulators 232 may additionally or alternatively process (e.g., convert to analog, amplify, filter, and upconvert) the output sample stream to obtain a downlink signal. Downlink signals from modulators of modulator/demodulators 232a through 232t may be transmitted via antennas 234a through 234t, respectively.

At UE 115, antennas 252a through 252r may receive the downlink signals from base station 105 and may provide received signals to demodulators (DEMODs) of modulator/demodulators 254a through 254r, respectively. Each demodulator of modulator/demodulators 254 may condition (e.g., filter, amplify, downconvert, and digitize) a respective received signal to obtain input samples. Each demodulator of modulator/demodulators 254 may further process the input samples (e.g., for OFDM, etc.) to obtain received symbols. MIMO detector 256 may obtain received symbols from demodulators of modulator/demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators of modulator/demodulators 254a through 254r (e.g., for SC-FDM, etc.), and transmitted to base station 105. At base station 105, the uplink signals from UE 115 may be received by antennas 234, processed by demodulators of modulator/demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 5 and 6 or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

In current implementations of wireless communication systems, such as LTE and/or 5G NR implementations, timers have been introduced to facilitate the control of various features of the wireless communication systems, such as part of mobility enhancements for faster radio link failure (RLF) recovery. These timers, also referred herein to as UE recovery timers, may include various timers, such as, in particular, a T310 timer and/or a T312 timer. These timers may be configured for particular measurement identities (e.g., a UE may define and/or be configured to enable use of any timer).

As used herein, a measurement identity may refer to an identification linking a measurement object to a reporting configuration. For example, a measurement object identification (ID) may be linked or associated with a reporting configuration ID using a measurement identity. In this case, the measurement identity may refer to the set that includes the measurement object ID and the reporting configuration ID. Timers (such as the T312 timer) may be defined for a measurement object.

In implementations, the T310 timer is a timer that is used to facilitate control of operations when physical layer problems for a PCell are detected. For example, the T310 timer may be defined for a particular measurement identity. The T310 timer may be started for the measurement identity by a UE upon detecting physical layer problems (e.g., upon a UE associated with the measurement identity receiving N310 consecutive out-of-sync indications from lower layers). The T310 timer may be stopped upon receiving N311 consecutive in-sync indications from lower layers for PCell, upon triggering a handover procedure, or upon initiation of a connection re-establishment procedure. On the other hand, upon expiry of the T310 timer, RLF may be declared. In particular, upon expiry of the T310 timer, if the T310 timer is configured at the master cell group (MCG), the UE may transition to an idle state (e.g., RRC_IDLE) when security is not activated, and may initiate a connection re-establishment procedure when security is activated. When the T310 timer is configured at the secondary cell group (SCG), an SCG RLF may be declared upon expiry of the T310 timer.

The T312 timer is a timer that is used as a short recovery timer, and may be used to facilitate control of RLF operations. For example, the T312 timer may be enabled for a particular measurement identity, and may be started or triggered when a measurement report for that measurement identity for which it is enabled is sent to the network (e.g., sent to a serving cell of the measurement identity) while the T310 timer is running. In implementations, the measurement report may be sent by the UE for the measurement identity and may indicate that the base station is to send over a handover command, or a PSCell change command. It is noted that although the present disclosure describes techniques within the context of a handover command, the techniques described may also be applicable within the context of a PSCell change. In any case, upon expiry of the T312 timer without a handover or a PSCell change command, early RLF may be declared (and RLF recovery may be attempted by triggering a re-establishment procedure) without having to wait for expiration of the T310 timer and RLF to be declared. On the other hand, if the handover or a PSCell change command is received before the expiration of the T312 timer, the UE may execute the handover or PSCell change in response and may connect to the target cell.

It is noted that in current implementations, the T312 timer may be enabled, configured, or defined for a subset of measurement identities and may not be enabled, configured, or defined for all measurement identities in a wireless communication system. As such, while the T312 timer may be configured for a first measurement identity, the T312 timer may not be configured for a second measurement identity. In this case, while functionality provided by the T312 recovery timer may be used for the first measurement identity, the functionality provided by the T312 recovery timer may not be used for the second measurement identity. In addition, the T312 timer may be configured and enabled by the network (e.g., a base station) for one or more measurement objects associated with one or more measurement report configurations forming multiple measurement identities and as such, the base station may be expected to send over a handover command (or a PSCell change command) when a measurement report for a measurement identity is sent to the base station. In some implementations, as the T312 timer may be configured for multiple measurement identities, it is possible that multiple measurement reports may be sent for multiple measurement identities, and in these implementations, the effect of such multiple measurement reports on the T312 timer is not defined.

Various aspects of the present disclosure relate to techniques that enable enhanced management of recovery timers in a wireless communication system. In particular aspects of the present disclosure, recovery timers (e.g., a T312 timer) may be managed in multi-SIM communications by defining controls for determining when to tune away from a first subscription to a second subscription, and when to forego tuning away, based on whether a recovery timer is currently running. By controlling when to tune-away and when to forego tuning away from a first subscription to a second subscription, aspects of the present disclosure enable a system to prevent a handover command (or a PSCell change command) from being missed by one of the subscription.

In aspects, the techniques that enable enhanced management of recovery timers may include techniques for managing and controlling recovery timers (e.g., a T312 timer) to determine whether to reset a recovery timer based on transmissions of measurement reports for multiple measurement identities. By controlling whether a recovery timer is reset based on transmissions of measurement reports for multiple measurement identities, aspects of the present disclosure enable a system to increase the probability that a handover command (or a PSCell change command) may be received by a UE.

Figure 3:
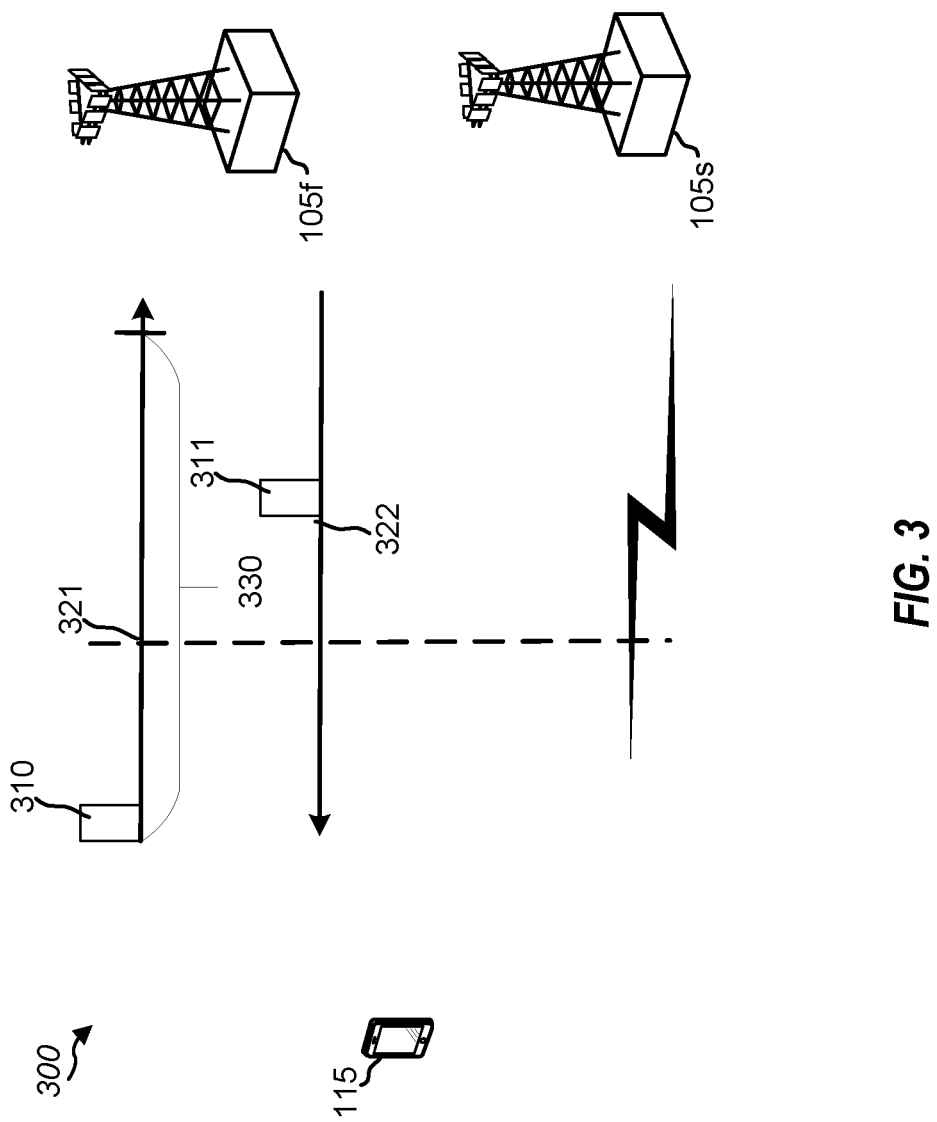
FIG. 3 is a diagram illustrating an example of a wireless communication system that supports enhanced management of recovery timers in accordance with aspects of the present disclosure.

FIG. 3 is a diagram illustrating an example of wireless communication system 300 that supports enhanced management of recovery timers in accordance with aspects of the present disclosure. In some examples, the wireless communications system 300 may implement aspects of the wireless network 100. The wireless communications system 300 includes the UE 115 and base stations 105$f$ and 105$s$. Although one UE 115 and two base stations 105$f$ and 105$s$ are illustrated, in some other implementations, the wireless communications system 300 may generally include multiple UEs 115, and may include more than two base stations.

In the example illustrated in FIG. 3, UE 115 may be configured for multi-SIM communications. In this example, UE 115 may be subscribed to both base station 105$f$ and base station 105$s$. The subscription between UE 115 and base station 105$f$ may be referred to as a first subscription, and the subscription between UE 115 and base station 105$s$ may be referred to as a second subscription. In this example, UE 115 may implement a multi-SIM communications scheme with both base station 105$f$ and base station 105$s$. It should be understood that the description herein with respect to a multi-SIM communication between one UE and two subscriptions is merely for illustrative purposes and should not be construed as limiting in any way. As such, a multi-SIM communication scheme may include more than two subscriptions and the techniques herein described may be equally applicable in such a situation.

In aspects, UE 115 may switch between the first subscription and the second subscription to perform multi-SIM communications. For example, while tuned to the first subscription (e.g., while the radio or radios of UE 115 is or are tuned to communicate with base station 105$f$), UE 115 may decide to tune-away from the first subscription to the second subscription (e.g., may decide to tune the radio or radios of UE 115 to communicate with base station 105$s$). This tune-away may be done for the UE to check if a page has been transmitted by the base station associated with the second subscription and to receive the page on the second subscription. In aspects, the tuning-away may be done in particular paging instances in which the UE tune-away from the current subscription to another subscription to check for pages. For example, UE 115 may, in accordance with current implementations, be scheduled, or may decide, to tune-away from the first subscription with base station 105$f$ to the second subscription with base station 105$s$ at time 321. In this case, however, a problem may occur when a T312 timer is running during a tune-away.

UE 115 may be configured or enabled with the T312 timer. As shown in FIG. 3, UE 115 may send measurement report 310 to base station 105$f$. In aspects, the measurement report 310 may be configured for a particular channel, and the configured channel may be the channel between the UE and a serving station, between the UE and a neighbor base station, etc. In this case, measurement report 310 may include measurements of the channel condition of the channel for which it is configured. For example, measurement report 310 may include measurements of the condition of the channel between UE 115 and base station 105$f$, measurements of the condition of the channel between UE 115 and base station 105$s$, etc. In some aspects, measurement report 310 may be sent while a T310 timer is already running (e.g., the channel conditions indicate that the conditions of the channel between base station 105$f$ and UE 115 are not good), or may be sent while the T310 timer is not running. In any case, sending measurement report 310 to base station 105$f$ may trigger or start T312 timer 330. Because measurement report 310 was sent to base station 105$f$, base station 105$f$ may be expected to send a handover command (or a PSCell change command) to UE 115. In the example illustrated in FIG. 3, handover command 311 may be sent to UE 115 by base station 105$f$, at time 322. However, in a typical implementation, UE 115 may tune-away from the first subscription to the second subscription at time 321, which is prior to time 322. As such, when base station 105$f$ sends handover command 311 at time 322 to UE 115, UE 115 may be tuned to base station 105$s$. Therefore, UE 115 may miss handover command 311. In this example, even if UE 115 returns to the first subscription, UE 115 may not receive handover command 311. As a result, T312 timer 330 may expire without the handover command being received by UE 115, which may result in an early RLF being declared and a re-establishment procedure.

In aspects of the present disclosure, controls may be defined for determining when to tune away from the first subscription to the second subscription, and when to forego tuning away. These controls may enable system 300 to ensure that handover command 311 may not be missed by UE 115. In aspects, the controls for determining when to tune away from the first subscription to the second subscription, and when to forego tuning away may include determining whether a recovery timer (e.g., a T312 timer) associated with the measurement identity for which the measurement report was generated is currently running. For example, in aspects, UE 115 may send measurement report 310 to base station 105f, which may cause T312 timer 330 to start. As mentioned above, UE 115 may be scheduled or may determine a paging instance at time 321. However, in accordance with aspects of the present disclosure, UE 115 may determine whether to tune-away from the first subscription to the second subscription based on whether a recovery timer is currently running. For example, UE 115 may determine whether T312 timer 330 is currently running. Based on a determination that a recovery timer is currently running, UE 115 may determine to forego tuning-away from the first subscription to the second subscription. In aspects, foregoing tuning-away from the first subscription to the second subscription may include remaining tuned to the link between UE 115 and base station 105f. In this case, when base station 105f sends handover command 311 at time 322, UE 115 may be tuned to base station 105f and may not miss handover command 311.

In aspects, based on a determination that a recovery timer is not currently running, UE 115 may determine to perform the tune-away from the first subscription to the second subscription. In aspects, tuning-away from the first subscription to the second subscription may include tuning to the link between UE 115 and base station 105s. By controlling when to tune-away and when to forego tuning away from the first subscription to the second subscription, UE 115 may be enabled to prevent missing handover command 311 when it is sent from base station 105f.

It is noted that although by foregoing tuning-away from the first subscription to the second subscription UE 115 may miss a page on the second subscription on a paging instance, it has been found that a page miss on such a paging instance is quite rare when compared to the probability of missing a handover command during a T312 duration. For example, a T312 duration may be up to 1000 ms. Therefore, the probability of missing a handover command during a T312 timer is significantly high.

In aspects, determining whether to tune-away or to forego tuning-away from the first subscription to the second subscription may be additionally based on further channel condition indicators. For example, when a channel condition indicator indicates a degradation of the communication channel for which the measurement report is generated to a particular threshold level (e.g., in a particular example the communication channel between the UE and the first subscription base station is degraded to a particular threshold level), the UE may decide to tune-away to the second subscription, even when a recovery timer is determined to be running for the UE based on a measurement report sent to the first subscription base station. Similarly, when a channel condition indicator indicates that the communication channel between the UE and the first subscription base station is not exceedingly degraded to the particular threshold level, the UE may decide to forego tuning-away to the second subscription when the recovery timer is determined to be running. For example, UE 115 may measure or obtain a channel indicator or a channel condition indicator for the channel between UE 115 and base station 105f. In this example, a measurement report has been sent from UE 115 to base station 105f, T312 timer 330 is running as a result of the measurement report being sent, and a handover command is expected to be sent from base station 105f to UE 115. In this case, the channel condition indicator may indicate that the channel between UE 115 and base station 105f is degraded. UE 115 may determine whether the degradation of the channel meets a threshold. When the degradation of the channel meets the threshold, the UE may determine to tune-away to the second subscription, even though T312 timer 330 is running. For example, UE 115 may measure, or obtain a measurement of, the block error rate (BLER) associated with the communication channel between UE 115 and base station 105f. In this case, when the BLER is below a threshold (e.g., may be below 80%), UE 115 may determine that the degradation threshold level has not been met, indicating that the channel condition is not exceedingly degraded, and so UE 115 may determine to forego-tuning away from the first subscription to the second subscription. In doing so, when base station 105f sends handover command 311 at time 322, UE 115 may be tuned to base station 105f and may thus be able to receive handover command 311. However, when the BLER is above the threshold, UE 115 may determine that the degradation threshold level has been met, indicating that the channel condition is exceedingly degraded, and so UE 115 may determine to tune away from the first subscription to the second subscription, even though T312 timer 330 may be running.

In another example, UE 115 may measure, or obtain a measurement of, the signal to noise ratio (SNR) associated with the communication channel between UE 115 and base station 105f. In this case, when the SNR is above a threshold, UE 115 may determine that the degradation threshold level has not been met, indicating that the channel condition is not exceedingly degraded, and so UE 115 may determine to forego-tuning away from the first subscription to the second subscription. In doing so, when base station 105f sends handover command 311 at time 322, UE 115 may be tuned to base station 105f and may thus be able to receive handover command 311. However, when the SNR is below the threshold, UE 115 may determine that the degradation threshold level has been met, indicating that the channel condition is exceedingly degraded, and so UE 115 may determine to tune away from the first subscription to the second subscription, even though T312 timer 330 may be running.

In another example, UE 115 may measure, or obtain a measurement of, a reference signal received power (RSRP) associated with the configured communication channel. In this case, when the RSRP is above a threshold, UE 115 may determine that the degradation threshold level has not been met, indicating that the channel condition is not exceedingly degraded, and so UE 115 may determine to forego-tuning away from the first subscription to the second subscription. In doing so, when base station 105f sends handover command 311 at time 322, UE 115 may be tuned to base station 105f and may thus be able to receive handover command 311. However, when the RSRP is below the threshold, UE 115 may determine that the degradation threshold level has been met, indicating that the channel condition is exceedingly degraded, and so UE 115 may determine to tune away from the first subscription to the second subscription, even though T312 timer 330 may be running.

In another example, UE 115 may measure, or obtain a measurement of, a reference signal received quality (RSRQ) associated with the configured communication channel. In this case, when the RSRQ is above a threshold, UE 115 may determine that the degradation threshold level has not been met, indicating that the channel condition is not exceedingly degraded, and so UE 115 may determine to forego-tuning away from the first subscription to the second subscription. In doing so, when base station 105f sends handover command 311 at time 322, UE 115 may be tuned to base station 105f and may thus be able to receive handover command 311. However, when the RSRQ is below the threshold, UE 115 may determine that the degradation threshold level has been met, indicating that the channel condition is exceedingly degraded, and so UE 115 may determine to tune away from the first subscription to the second subscription, even though T312 timer 330 may be running.

In aspects, UE 115 may determine to forego tuning-away from the first subscription based on the channel condition indicators indicating a good channel (or a channel that is not exceedingly degraded) because there is a likelihood that UE 115 may be able to receive handover command 311 as the channel conditions are not exceedingly degraded. On the other hand, when the channel conditions are degraded to a degradation threshold level indicating exceedingly degraded channel conditions, UE 115 may decide to tune away to the second subscription even if the T312 timer is running because there is a likelihood that UE 115 may not be able to receive handover command 311 as the channel conditions are exceedingly degraded. As such, UE 115 may determine that it is more efficient to tune-away to the second subscription to attend to the paging instance.

It is again noted that although the discussion above (and below) with respect to further channel condition indicators is focused on channel conditions of the channel between the UE and the base station associated with the first subscription, the channel conditions indicators upon which the above techniques may be applied may include channel conditions of a channel between the UE and a serving base station, a neighboring base station, etc., and as such, the discussion above should not be construed as limiting in any way.

Figure 4A:
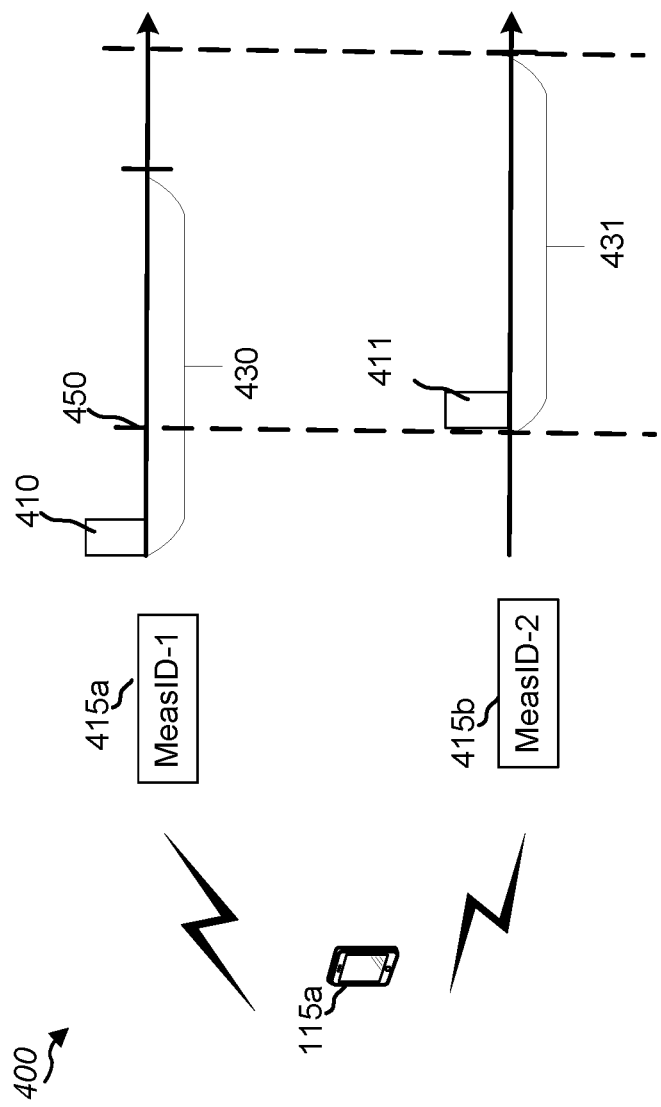
FIGS. 4A and 4B are diagrams illustrating examples of a wireless communication system that supports enhanced management of recovery timers in accordance with aspects of the present disclosure.
Figure 4B:
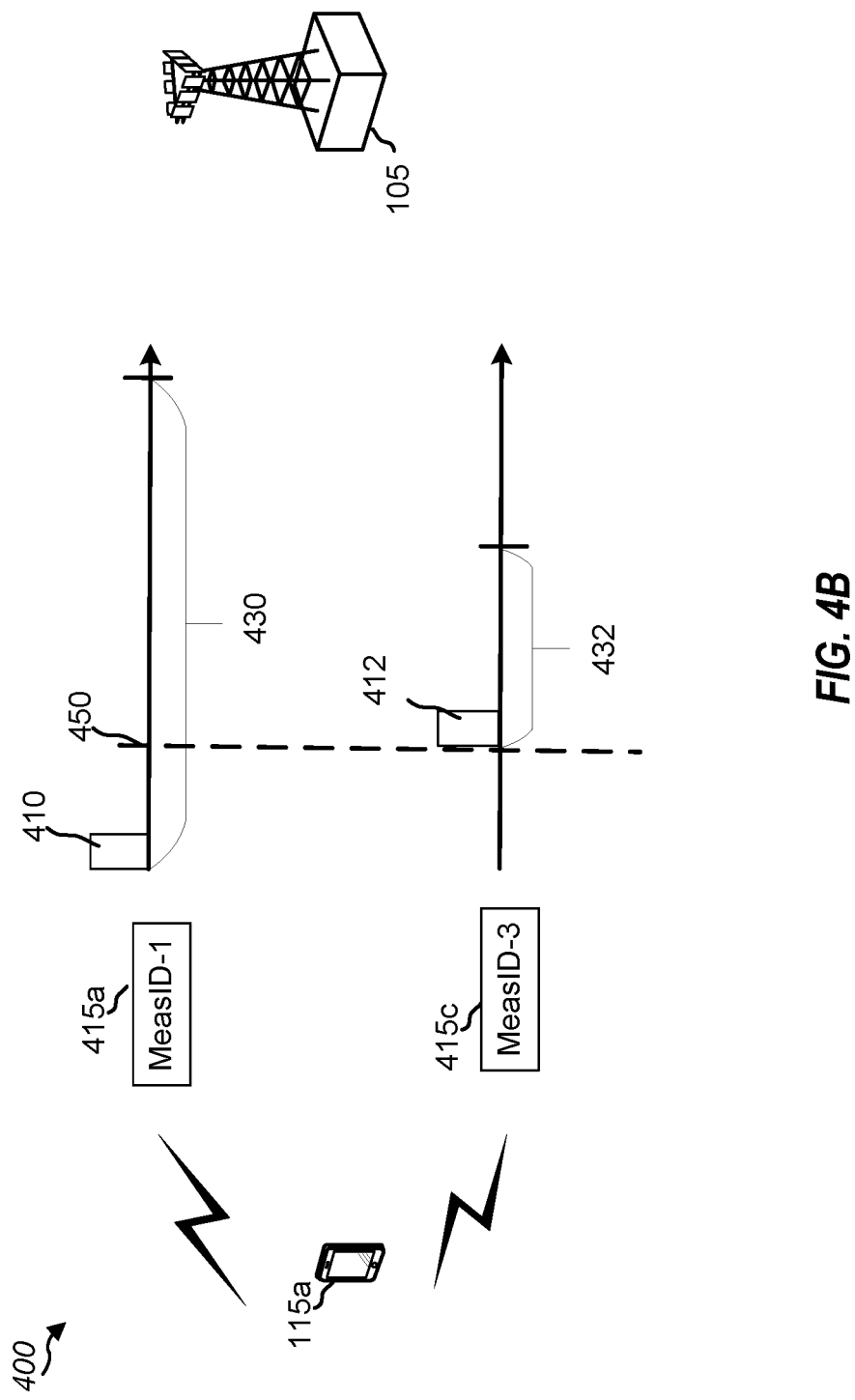

FIGS. 4A and 4B are diagrams illustrating examples of wireless communication system 400 that supports enhanced management of recovery timers in accordance with aspects of the present disclosure. In particular, FIGS. 4A and 4B illustrate a system providing for managing recovery timers by resetting of the recovery timers based on transmissions of measurement reports for multiple measurement identities. In some examples, wireless communications system 400 may implement aspects of the wireless network 100. The wireless communications system 400 includes at least one UE (e.g., UE 115a) and base station 105. Although one UE and one base station are illustrated, in some other implementations, the wireless communications system 400 may generally include multiple UEs and multiple base stations, and may not be limited to the numbers illustrated in the examples herein.

As noted above, the T312 timer may be enabled for multiple measurement identities of a UE. Furthermore, the configuration of the T312 timer may be individually configured for each measurement identity for which it is enabled. In the example illustrated in FIG. 4A, the T312 timer may be enabled or configured for both measurement identity 415a and measurement identity 415b configured for UE 115a. In aspects, the duration of the T312 timer may be individually configured for each measurement identity. In this example, measurement identity 415a may be configured with a duration of 500 ms for the T312 timer. In this same example, measurement identity 415b may be configured with a duration of 500 ms for the T312 timer.

As noted above, in aspects, the T312 timer may be started or triggered upon a measurement report for a measurement identity for which the T312 timer is enabled being sent to a base station. For example, UE 115a may send a measurement report 410 for measurement identity 415a to base station 105. As a result of sending measurement report 410 to base station 105, the T312 timer may be started for a first duration 430 of 500 ms. As mentioned above, a handover command (or a PSCell change command) may be expected from base station 105 during the duration of the T312 timer (e.g., 500 ms). If the handover command is not received, early RLF may be declared as result.

However, UE 115a may also send measurement report 411 for measurement identity 415b to base station 105 at time 450. As shown in FIG. 4, time 450 falls within the duration of the T312 timer triggered by the sending of measurement report 410 for measurement identity 415a by UE 115a. In this situation, the T312 timer may again be triggered with second duration 431 (e.g., 500 ms) as configured for measurement identity 415b based on sending measurement report 411. Current implementations do not provide functionality for addressing such a situation. For example, base station 105 may not send a handover command for measurement report 410 for UE 115a because a second measurement report (e.g., measurement report 411) has been sent.

In aspects of the present disclosure, recovery timers (e.g., a T312 timer) may be managed and controlled to determine whether to reset the recovery timer based on transmissions of measurement reports for multiple measurement identities. By controlling whether a recovery timer is reset based on transmissions of measurement reports for multiple measurement identities, aspects of the present disclosure enable a system to increase the probability that a handover command (or a PSCell change command) may be received by a UE. In aspects, controlling whether a recovery timer is reset may be based on detection of a measurement event associated with a second measurement identity. For example, in aspects, a measurement event associated with a second measurement identity may include a subsequent measurement report for a second measurement identity being sent to the base station while a recovery timer associated with a prior measurement report for a first measurement identity is running. In the example illustrated by FIG. 4A, UE 115a may send, subsequent to the sending of measurement report 410 for measurement identity 415a to base station 105, measurement report 412 for measurement identity 415b while the T312 timer is still running. In accordance with aspects of the present disclosure, upon detecting of the measurement event associated with the measurement identity 415b, the T312 timer may be reset.

In aspects, resetting the T312 timer may include restarting the T312 timer. For example, as shown in FIG. 4A, the T312 timer may start running when measurement report 410 associated with measurement identity 415a is sent to base station 105. In this example, the T312 timer may be configured to run for 500 ms. At time 450, which in this example may be 100 ms after the T312 timer started running, measurement report 411 associated with measurement identity 415*b* is sent to base station 105. This measurement event (e.g., a subsequent measurement report sent while the T312 is running) may be detected, and in response, the T312 timer may be restarted according to the duration configured for measurement identity 415*b*, which in this case is also 500 ms. As such, the T312 timer in this example may run for 100 ms+500 ms=600 ms. By doing so, the duration of the T312 timer is extended thereby providing an opportunity for the handover associated with measurement report 410 to be sent to UE 115*a* from base station 105.

In aspects, the configuration of the T312 timer may be different for different measurement identities. FIG. 4B shows another example of wireless communication system 400 in which measurement identities are configured with different durations for the T312 timer. For example, measurement identity 415*a* may be configured with a duration of 500 ms for the T312 timer, and measurement identity 415*c* may be configured with duration 432 of 200 ms for the T312 timer. In aspects, when the duration of the T312 timer is different for different measurement identities, simply restarting the T312 timer may not be ideal. For example, as shown in FIG. 4B, the T312 timer may start running when measurement report 410 associated with measurement identity 415*a* is sent to base station 105. In this example, the T312 timer may be configured to run for 500 ms. At time 450, which in this example may be 100 ms after the T312 timer started running, measurement report 412 associated with measurement identity 415*c* may be sent to base station 105. This measurement event (e.g., a subsequent measurement report sent while the T312 is running) may be detected. If the T312 timer were simply restarted in response to detecting the measurement event at time 450 and were to run for another 200 ms (e.g., the duration configured for measurement identity 415*c*), the total duration of the T312 timer would be 300 ms, which would not cover the 500 ms of measurement identity 415*a*'s configuration.

In accordance with aspects of the present disclosure, when the duration of the recovery timer for different measurement identities is different, resetting the recovery timer may include determining a reset duration that covers the duration of all recovery timers that have been triggered. For example, in the example shown in FIG. 4B, resetting the T312 timer may include resetting the T312 timer to a reset duration that covers the 500 ms of measurement identity 415*a*'s configuration, and the 200 ms of measurement identity 415*c*'s configuration. In this case, as the T312 timer has run for 100 ms, there are 400 ms left on measurement identity 415*a*'s T312 timer. Measurement identity 415*c*'s recovery timer is configured with a duration of 200 ms. Therefore, in this case, resetting the T312 timer when measurement report 412 is sent at time 450 may include letting the T312 timer continue for the remaining 400 ms, which may include the 200 ms of measurement identity 415*c*'s configuration. In a way, in this example, resetting the recovery timer includes letting the recovery timer continue without restarting it.

In another example, the T312 timer triggered by measurement report 410 may have been running for 400 ms at time 450 when measurement report 412 is sent to base station 105. In this case, resetting the T312 timer when measurement report 412 is sent at time 450 may include resetting the T312 timer to a reset duration of 200 ms (e.g., the duration configured for measurement identity 415*c*) effectively extending the T312 timer, as doing so would cover the 100 ms remaining for measurement identity 415*a* (for a total of 500 ms) and the 200 ms for measurement identity 415*c*.

In aspects, resetting the recovery timer when the duration of the recovery timer for different measurement identities is different may include determining the remaining duration of the currently running recovery timer, determining the duration of the newly triggered recovery timer, calculating a duration that includes both the remaining duration and the newly triggered duration, and resetting the recovery timer to the calculated duration. In some aspects, resetting the recovery timer when the duration of the recovery timer for different measurement identities is different may include determining the largest configured duration of the durations configured for the triggered recovery timers (e.g., the largest of the triggered recovery timers) and resetting the recovery timer to the largest triggered duration.

In aspects, determining whether to reset the recovery timer (e.g., to restart, to extend, or to continue with the recovery timer duration) may be additionally based on further channel condition indicators. For example, when a channel condition indicator indicates that the communication channel between the UE that sent the measurement report that triggered the recovery timer that is to be reset and the base station from which the handover command associated with the measurement report is to be sent is degraded to a particular degradation threshold level, the UE may decide to trigger RLF or to trigger a re-establishment procedure rather than letting the recovery timer be reset and waiting for the handover command. Similarly, when a channel condition indicator indicates that the communication channel between the UE and the base station is not exceedingly degraded to the particular degradation threshold level, the UE may decide to reset the recovery timer and continue waiting for the handover command, rather than triggering RLF or a re-establishment procedure. For example, UE 115*a* may measure or obtain a channel indicator or a channel condition indicator for the channel between UE 115*a* and base station 105. In this example, measurement report 410 has been sent from UE 115*a* to base station 105, the T312 timer is running as a result of measurement report 410 being sent, and a handover command is expected to be sent from base station 105 to UE 115*a*. In this case, the channel condition indicator may indicate that the channel between UE 115*a* and base station 105 is degraded. UE 115*a* may determine whether the degradation of the channel meets a degradation threshold. When the degradation of the channel meets the degradation threshold, the UE may determine not to reset the T312 timer to extend, restart, or continue. This is because, as the condition of the channel is exceedingly degraded, resetting the T312 timer to continue waiting for the handover command may not be efficient. In this case, it may be more efficient to trigger RLF and/or a re-establishment procedure.

On the other hand, when the degradation of the channel does not meet the degradation threshold, the UE may determine to reset the T312 timer to extend, restart, or continue, as described above. This is because, as the condition of the channel is not exceedingly degraded, resetting the T312 timer to continue waiting for the handover command may be more efficient than triggering RLF and/or a re-establishment procedure.

In aspects, the channel condition indicators may include a BLER, an SNR, an RSRP and/or an RSRQ. In aspects, a degradation threshold may be considered met when the BLER is above an error rate threshold (e.g., may be above 80%), when the SNR is below a signal ratio threshold, and/or when an RSRP or RSRQ is below a threshold, and UE 115*a* may determine that the degradation threshold level has been met indicating that the channel condition is exceedingly degraded. In this case, UE 115*a* may determine not to reset the T312 timer to extend, restart, or continue. On the other hand, when the BLER is below the error rate threshold (e.g., may be at or below 80%), when the SNR is at or above the signal ratio threshold, and/or when an RSRP or RSRQ is at or above a threshold, UE 115*a* may determine that the degradation threshold level has not been met indicating that the channel condition is not exceedingly degraded. In this case, UE 115*a* may determine to reset the T312 timer to extend, restart, or continue.

It is again noted that although the discussion above with respect to further channel condition indicators (e.g., BLER, SNR, RSRP, RSRQ, etc.) is focused on channel conditions of the channel between the UE and a serving base station, the channel conditions indicators upon which the above techniques may be applied may include channel conditions of a channel between the UE and a serving base station, a neighboring base station, etc., and as such, the discussion above should not be construed as limiting in any way.

Figure 5:
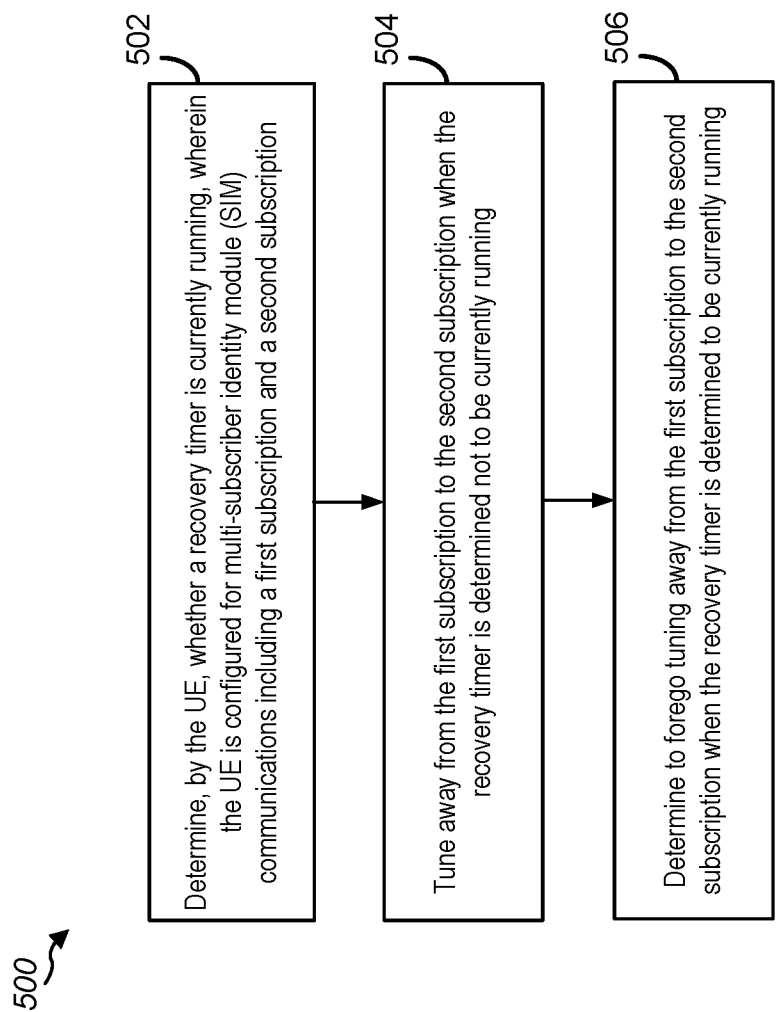
FIG. 5 is a flow diagram illustrating an example process that supports enhanced management of recovery timers in a wireless communication system according to one or more aspects.
Figure 7:
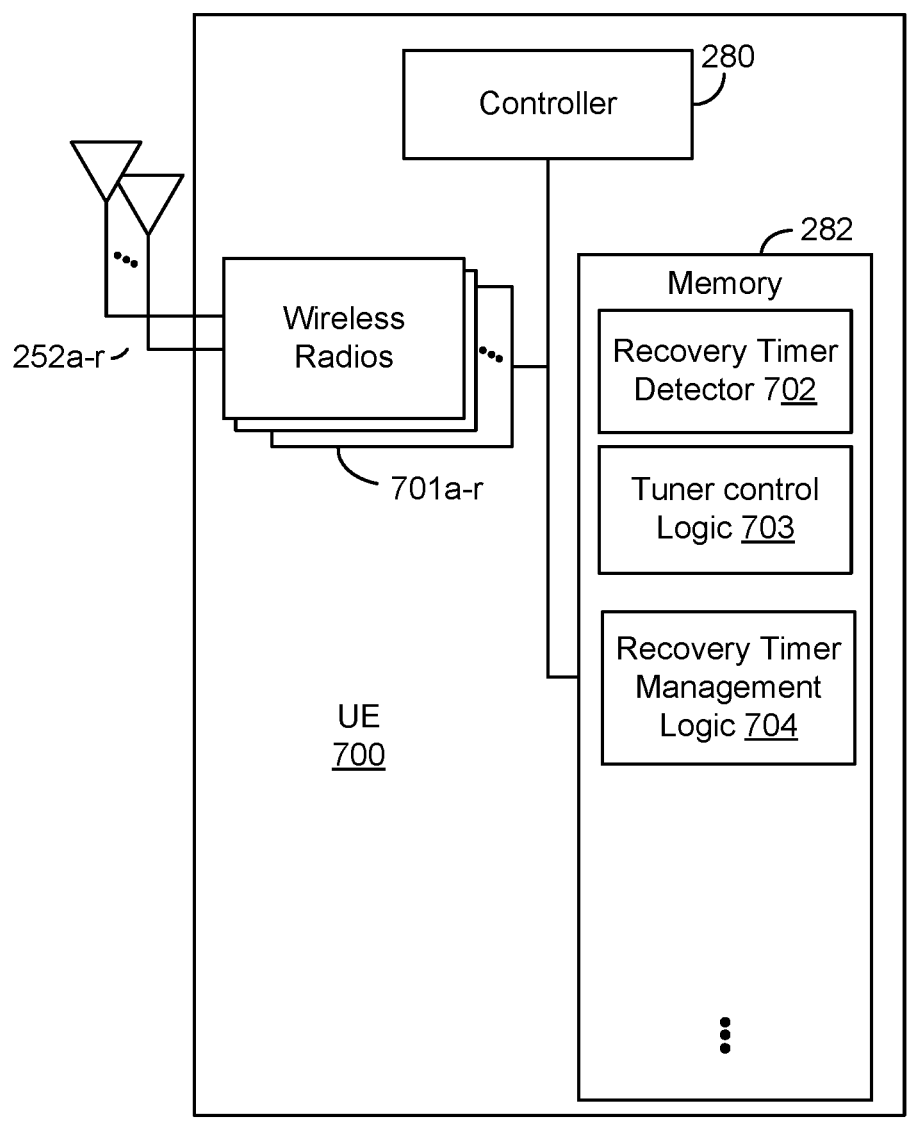
FIG. 7 is a block diagram of an example UE that supports enhanced management of recovery timers according to one or more aspects.

FIG. 5 is a flow diagram illustrating an example process 500 that supports enhanced management of recovery timers in a wireless communication system according to one or more aspects. Operations of process 500 may be performed by a UE, such as UE 115 described above with reference to FIGS. 1, 2, 3, or UE 700 described with reference to FIG. 7. For example, example operations (also referred to as "blocks") of process 500 may enable UE 115 to support enhanced management of recovery timers. FIG. 7 is a block diagram illustrating UE 115 configured according to aspects of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 701*a-r* and antennas 252*a-r*. Wireless radios 701*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 502, a UE determines whether a recovery timer is currently running. In order to implement the functionality for such operations, UE 115, under control of controller/processor 280, executes recovery timer detector 702, stored in memory 282. The functionality implemented through the execution environment of recovery timer detector 702 allows for UE 115 to perform recovery timer detection operations according to the various aspects herein. In embodiments, the UE may be configured for multi-SIM communications and may include a first subscription and a second subscription.

In aspects, the recovery timer may be a T312 timer enabled for UE 115 and/or for a particular measurement identity, and UE 115 may be configured with a duration for the T312 timer.

At block 504, UE 115 tunes away from the first subscription to the second subscription when the recovery timer is determined not to be currently running. In order to implement the functionality for such operations, UE 115, under control of controller/processor 280, executes tuner control logic 703, stored in memory 282. The functionality implemented through the execution environment of tuner control logic 703 allows for UE 115 to perform tune-away operations according to the various aspects herein.

In aspects, tuning away from the first subscription to the second subscription when the recovery timer is determined not to be currently running may include tuning away to the second subscription to monitor for a paging message in the second subscription.

At block 506, UE 115 determines to forego tuning away from the first subscription to the second subscription when the recovery timer is determined to be currently running. In order to implement the functionality for such operations, UE 115, under control of controller/processor 280, executes tuner control logic 703, stored in memory 282. The functionality implemented through the execution environment of tuner control logic 703 allows for UE 115 to perform tune-away foregoing operations according to the various aspects herein.

In aspects, when foregoing tuning away from the first subscription to the second subscription when the recovery timer is determined to be currently running, a handover command may be received from a base station prior to expiration of the recovery timer. In aspects, in response to receiving a handover command from a base station, the recovery timer.

In aspects, determining to forego tuning away from the first subscription to the second subscription when the recovery timer is determined to be currently running includes measuring a value of a channel condition indicator, determining whether the measured value meets a degradation threshold, and foregoing tuning away from the first subscription to the second subscription when the measured value meets the degradation threshold.

In aspects, the channel condition indicator may include a BLER, and determining whether the measured value for the channel condition indicator meets the degradation threshold includes determining whether the measured value is below or above a threshold BLER. When the measured value is below the threshold BLER, the degradation threshold is determined not to be met. In this case, UE 115 may determine to forego tuning away from the first subscription to the second subscription. When the measured value is at or above the threshold BLER, the degradation threshold is determined to be met. In this case, UE 115 may determine to tune away from the first subscription to the second subscription.

In aspects, the channel condition indicator may include an SNR, and determining whether the measured value for the channel condition indicator meets the degradation threshold includes determining whether the measured value is below or above a threshold SNR. When the measured value is at or above the threshold SNR, the degradation threshold may be determined not to be met. In this case, UE 115 may determine to forego tuning away from the first subscription to the second subscription. When the measured value is below the threshold SNR, the degradation threshold is determined to be met. In this case, UE 115 may determine to tune away from the first subscription to the second subscription.

Figure 6:
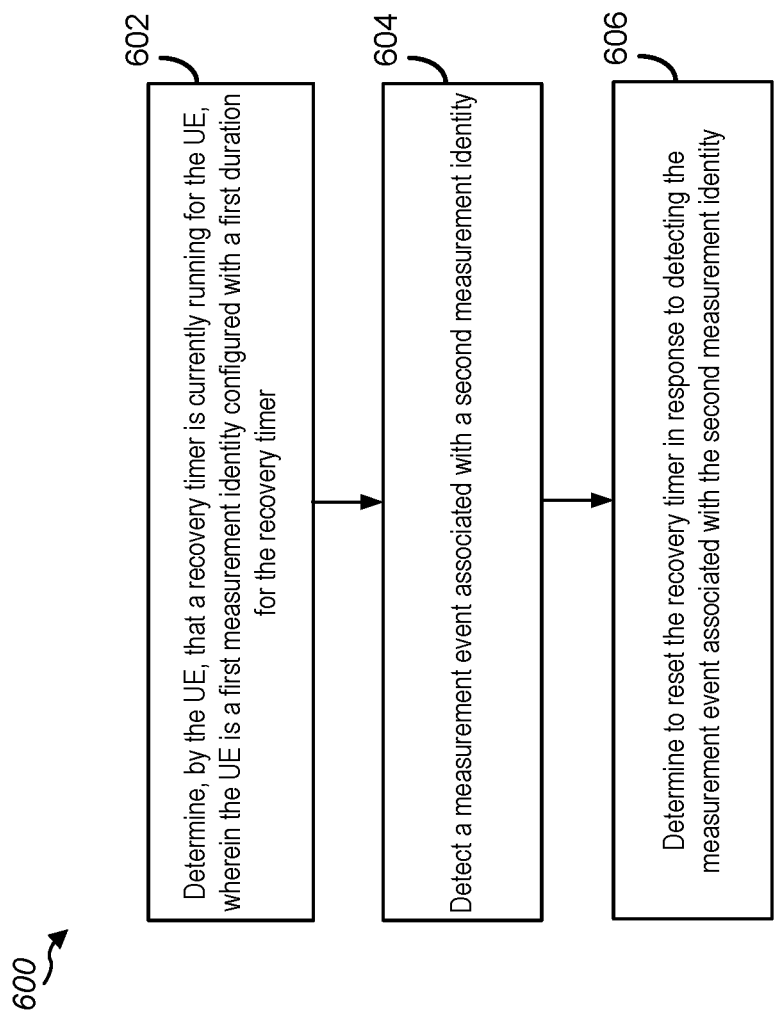
FIG. 6 is another flow diagram illustrating an example process that supports enhanced management of recovery timers in a wireless communication system according to one or more aspects.

FIG. 6 is a flow diagram illustrating an example process 600 that supports enhanced management of recovery timers in a wireless communication system according to one or more aspects. Operations of process 600 may be performed by a UE, such as UE 115 described above with reference to FIGS. 1, 2, 3, or a UE described with reference to FIG. 7.

At block 602, a UE determines whether a recovery timer is currently running for the UE. In order to implement the functionality for such operations, UE 115, under control of controller/processor 280, executes recovery timer detector 702, stored in memory 282. The functionality implemented through the execution environment of recovery timer detector 702 allows for UE 115 to perform recovery timer detection operations according to the various aspects herein. In aspects, UE 115 may be configured with a first measurement identity configured with a first duration for the recovery timer and a second measurement identity configured with a second duration for the recovery timer.

At block 604, UE 115 detects a measurement event associated with the second measurement identity. In order to implement the functionality for such operations, UE 115, under control of controller/processor 280, executes recovery timer management logic 704, stored in memory 282. The functionality implemented through the execution environment of recovery timer management logic 704 allows for UE 115 to perform measurement event detection operations according to the various aspects herein.

In aspects, the measurement event associated with the second measurement identity includes sending a measurement report for the second measurement identity. In aspects, the second measurement identity is configured with a second duration for the recovery timer, the second duration different than the first duration.

At block 606, UE 115 determines to reset the recovery timer in response to detecting the measurement event associated with the second measurement identity. In order to implement the functionality for such operations, UE 115, under control of controller/processor 280, executes recovery timer management logic 704, stored in memory 282. The functionality implemented through the execution environment of recovery timer management logic 704 allows for UE 115 to perform recovery timer resetting operations according to the various aspects herein.

In aspects, determining to reset the recovery timer may include determining a remaining duration of recovery timer currently running, determining a newly triggered duration of a newly triggered recovery timer associated with the measurement event associated with the second measurement identity, calculating a reset duration that includes the remaining duration and the newly triggered duration, and resetting the recovery timer to the calculated reset duration.

In aspects, determining to reset the recovery timer may include measuring a value of a channel condition indicator, determining whether the measured value meets a degradation threshold, and resetting the recovery timer when the measured value does not meet the degradation threshold. In aspects, UE 115 may forego resetting the recovery timer when the measured value meets the degradation threshold In aspects, the channel condition indicator may include a BLER, and determining whether the measured value for the channel condition indicator meets the degradation threshold includes determining whether the measured value is below or above a threshold BLER. When the measured value is below the threshold BLER, the degradation threshold is determined not to be met. In this case, UE 115 may determine to reset the recovery timer. When the measured value is at or above the threshold BLER, the degradation threshold is determined to be met. In this case, UE 115 may determine to forego resetting the recovery timer.

In aspects, the channel condition indicator may include an SNR, and determining whether the measured value for the channel condition indicator meets the degradation threshold includes determining whether the measured value is below or above a threshold SNR. When the measured value is at or above the threshold SNR, the degradation threshold may be determined not to be met. In this case, UE 115 may determine to reset the recovery timer. When the measured value is below the threshold SNR, the degradation threshold is determined to be met. In this case, UE 115 may determine to forego resetting the recovery timer.

In one or more aspects, techniques for supporting enhanced management of recovery timers in a wireless communication system according to one or more aspects may include additional aspects, such as any single aspect or any combination of aspects described below or in connection with one or more other processes or devices described elsewhere herein. In a first aspect, supporting enhanced management of recovery timers in a wireless communication system may include an apparatus configured to determine whether a recovery timer is currently running. In the first aspect, the apparatus may be configured for multi-SIM communications including a first subscription and a second subscription. The apparatus is further configured to tune away from the first subscription to the second subscription when the recovery timer is determined not to be currently running, and determine to forego tuning away from the first subscription to the second subscription when the recovery timer is determined to be currently running. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the recovery timer is a T312 timer enabled for the UE.

In a third aspect, alone or in combination with one or more of the first aspect or the second aspect, tuning away from the first subscription to the second subscription when the recovery timer is determined not to be currently running includes tuning away to the second subscription to monitor for a paging message in the second subscription.

In a fourth aspect, alone or in combination with one or more of the first aspect through the third aspect, the techniques in the first aspect may also include, when foregoing tuning away from the first subscription to the second subscription when the recovery timer is determined to be currently running, receiving a handover command from a base station prior to expiration of the recovery timer.

In a fifth aspect, alone or in combination with the fourth aspect, the techniques in the first aspect may also include, when foregoing tuning away from the first subscription to the second subscription when the recovery timer is determined to be currently running, stopping, in response to receiving a handover command from a base station, the recovery timer.

In a sixth aspect, alone or in combination with one or more of the first aspect through the fifth aspect, determining to forego tuning away from the first subscription to the second subscription when the recovery timer is determined to be currently running includes measuring a value of a channel condition indicator; determining whether the measured value meets a degradation threshold; and foregoing tuning away from the first subscription to the second subscription when the measured value does not meet the degradation threshold.

In a seventh aspect, alone or in combination with the sixth aspect, determining to forego tuning away from the first subscription to the second subscription when the recovery timer is determined to be currently running includes determining whether the measured value meets a degradation threshold.

In an eighth aspect, alone or in combination with one or more of the sixth aspect through the seventh aspect, determining to forego tuning away from the first subscription to the second subscription when the recovery timer is determined to be currently running includes foregoing tuning away from the first subscription to the second subscription when the measured value does not meet the degradation threshold.

In a ninth aspect, alone or in combination with one or more of the first aspect through the eighth aspect, the techniques in the first aspect may also include tuning away from the first subscription to the second subscription when the measured value meets the degradation threshold.

In a tenth aspect, alone or in combination with one or more of the first aspect through the ninth aspect, the channel condition indicator is a block error rate (BLER), and determining that the measured value meets the degradation threshold includes determining that the measured value is above a threshold BLER.

In an eleventh aspect, alone or in combination with one or more of the first aspect through the tenth aspect, the channel condition indicator is a signal to noise ratio (SNR), and determining that the measured value meets the degradation threshold includes determining that the measured value is below a threshold SNR.

In a twelfth aspect, alone or in combination with one or more of the first aspect through the eleventh aspect, the channel condition indicator is a reference signal received power (RSRP), and determining that the measured value meets the degradation threshold includes determining that the measured value is below a threshold RSRP.

In a thirteenth aspect, alone or in combination with one or more of the first aspect through the twelfth aspect, the channel condition indicator is a reference signal received quality (RSRQ), and determining that the measured value meets the degradation threshold includes determining that the measured value is below a threshold RSRQ.

In a fourteenth aspect, alone or in combination with one or more of the first aspect through the thirteenth aspect, the recovery timer is triggered by sending a measurement report associated with the recovery timer.

In a fifteenth aspect, alone or in combination with one or more of the first aspect through the fourteenth aspect.

In a fifteenth aspect, the techniques for supporting enhanced management of recovery timers in a wireless communication system according to one or more aspects may include determining, by a UE, that a recovery timer is currently running for the UE. In aspects, the UE is a first measurement identity configured with a first duration for the recovery timer. The techniques in the fifteenth aspect may also include detecting a measurement event associated with a second measurement identity, and determining to reset the recovery timer in response to detecting the measurement event associated with the second measurement identity.

In a sixteenth aspect, alone or in combination with the fifteenth aspect, the measurement event associated with the second measurement identity includes sending a measurement report for the second measurement identity.

In a seventeenth aspect, alone or in combination with one or more of the fifteenth aspect through the sixteenth aspect, the second measurement identity is configured with a second duration for the recovery timer, the second duration different than the first duration.

In an eighteenth aspect, alone or in combination with one or more of the fifteenth aspect through the seventeenth aspect, determining to reset the recovery timer includes determining a remaining duration of recovery timer currently running.

In a nineteenth aspect, alone or in combination with the eighteenth aspect, determining to reset the recovery timer includes determining a newly triggered duration of a newly triggered recovery timer associated with the measurement event associated with the second measurement identity.

In a twentieth aspect, alone or in combination with one or more of the eighteenth aspect through the nineteenth aspect, determining to reset the recovery timer includes calculating a reset duration that includes the remaining duration and the newly triggered duration.

In a twenty-first aspect, alone or in combination with one or more of the eighteenth aspect through the twentieth aspect, determining to reset the recovery timer includes resetting the recovery timer to the calculated reset duration.

In a twenty-second aspect, alone or in combination with one or more of the fifteenth aspect through the twenty-first aspect, determining to reset the recovery timer includes measuring a value of a channel condition indicator.

In a twenty-third aspect, alone or in combination with the twenty-second aspect, determining to reset the recovery timer includes determining whether the measured value meets a degradation threshold.

In a twenty-fourth aspect, alone or in combination with one or more of the twenty-second aspect through the twenty-third aspect, determining to reset the recovery timer includes resetting the recovery timer when the measured value does not meet the degradation threshold.

In a twenty-fifth aspect, alone or in combination with one or more of the fifteenth aspect through the twenty-fourth aspect, the techniques in the fifteenth aspect include foregoing to reset the recovery timer when the measured value meets the degradation threshold.

In a twenty-sixth aspect, alone or in combination with one or more of the fifteenth aspect through the twenty-fifth aspect, the channel condition indicator is one or more of: a BLER, an SNR, an RSRP, and an RSRQ.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-7 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed at a user equipment (UE), the method comprising:
   configuring the UE with a first measurement identity having a first duration for a recovery timer;
   detecting a measurement event associated with a second measurement identity while the recovery timer is running during the first duration; and
   controlling reset of the recovery timer in response to detecting the measurement event associated with the second measurement identity while the recovery timer is running.

2. The method of claim 1, wherein the measurement event associated with the second measurement identity includes sending a measurement report.

3. The method of claim 1, further comprising:
   configuring the UE with the second measurement identity having a second duration for the recovery timer, the second duration different than the first duration.

4. The method of claim 1, wherein controlling reset of the recovery timer includes:
   resetting the recovery timer to a reset duration that includes a remaining duration of the recovery timer running while the measurement event is detected and a newly triggered duration of a newly triggered recovery timer associated with the measurement event.

5. The method of claim 1, wherein controlling reset of the recovery timer includes:
   measuring a value of a channel condition indicator; and
   resetting the recovery timer when the value of the channel condition indicator as measured does not meet a degradation threshold.

6. The method of claim 5, wherein controlling reset of the recovery timer includes:
   foregoing to reset the recovery timer when the value of the channel condition indicator as measured meets or exceeds the degradation threshold.

7. The method of claim 5, wherein the channel condition indicator is one or more of: a block error rate (BLER), a signal to noise ratio (SNR), a reference signal received power (RSRP), and a reference signal received quality (RSRQ).

8. An apparatus for wireless communication comprising:
   a processing system that includes at least one processor coupled to a memory, the processing system configured to cause the apparatus to:
   configure the apparatus with a first measurement identity having a first duration for a recovery timer;
   detect a measurement event associated with a second measurement identity while the recovery timer is running during the first duration; and
   control reset of the recovery timer in response to detecting the measurement event associated with the second measurement identity while the recovery timer is running.

9. The apparatus of claim 8, wherein the measurement event associated with the second measurement identity includes sending a measurement report.

10. The apparatus of claim 8, wherein the processing system is configured to cause the apparatus to:
    configure the apparatus with the second measurement identity having a second duration for the recovery timer, the second duration different than the first duration.

11. The apparatus of claim 8, wherein the processing system causing the apparatus to control reset of the recovery timer includes causing the apparatus to:
    reset the recovery timer to a reset duration that includes a remaining duration of the recovery timer running while the measurement event is detected and a newly triggered duration of a newly triggered recovery timer associated with the measurement event.

12. The apparatus of claim 8, wherein the processing system causing the apparatus to control reset of the recovery timer includes causing the apparatus to:
    measure a value of a channel condition indicator; and
    reset the recovery timer when the value of the channel condition indicator as measured does not meet a degradation threshold.

13. The apparatus of claim 12, wherein the processing system causing the apparatus to control reset of the recovery timer includes causing the apparatus to:
    forego resetting the recovery timer when the value of the channel condition indicator as measured meets or exceeds the degradation threshold.

14. The apparatus of claim 12, wherein the channel condition indicator is one or more of: a block error rate (BLER), a signal to noise ratio (SNR), a reference signal received power (RSRP), and a reference signal received quality (RSRQ).

15. The apparatus of claim 8, further comprising:

a transceiver configured to transmit a measurement report during the first duration, wherein the measurement event associated with the second measurement identity includes transmission of the measurement report, and wherein the apparatus is configured as a user equipment (UE).

16. An apparatus for wireless communication comprising:

means for configuring the apparatus with a first measurement identity having a first duration for a recovery timer;

means for detecting a measurement event associated with a second measurement identity while the recovery timer is running during the first duration; and means for controlling reset of the recovery timer in response to detecting the measurement event associated with the second measurement identity while the recovery timer is running.

17. The apparatus of claim 16, further comprising:

means for configuring the apparatus with the second measurement identity having a second duration for the recovery timer, the second duration different than the first duration.

18. The apparatus of claim 16, wherein the means for controlling reset of the recovery timer includes:

means for resetting the recovery timer to a reset duration that includes a remaining duration of the recovery timer running while the measurement event is detected and a newly triggered duration of a newly triggered recovery timer associated with the measurement event.

19. The apparatus of claim 16, wherein means for controlling reset of the recovery timer includes:

means for measuring a value of a channel condition indicator; and means for resetting the recovery timer when the value of the channel condition indicator as measured does not meet a degradation threshold.

20. The apparatus of claim 19, wherein the means for controlling reset of the recovery timer includes:

means for foregoing to reset the recovery timer when the value of the channel condition indicator as measured meets or exceeds the degradation threshold.

* * * * *